(12) United States Patent
Sugiyama

(10) Patent No.: US 6,881,500 B2
(45) Date of Patent: Apr. 19, 2005

(54) CHAIN

(75) Inventor: Shinichiro Sugiyama, Saitama (JP)

(73) Assignee: Sugiyama Chain Co., Ltd., Iruma (JP)

( * ) Notice: Subject to any disclaimer, the term of this patent is extended or adjusted under 35 U.S.C. 154(b) by 0 days.

(21) Appl. No.: 10/493,315

(22) PCT Filed: Nov. 1, 2002

(86) PCT No.: PCT/JP02/11419

§ 371 (c)(1),
(2), (4) Date: May 4, 2004

(87) PCT Pub. No.: WO03/040591

PCT Pub. Date: May 15, 2003

(65) Prior Publication Data

US 2004/0265620 A1 Dec. 30, 2004

(30) Foreign Application Priority Data

Nov. 9, 2001 (JP) ........................................ 2001-344588

(51) Int. Cl.$^7$ ...................... B32B 15/18; F16G 13/00
(52) U.S. Cl. ...................... 428/687; 428/609; 428/682; 428/684; 29/90.7; 59/78; 72/53
(58) Field of Search ................................ 428/687, 609, 428/682, 684; 29/90.7; 59/78; 72/53

(56) References Cited

U.S. PATENT DOCUMENTS 5,980,659 A 11/1999 Kawaura et al.

FOREIGN PATENT DOCUMENTS

| JP | 55-44559 | 3/1980 |
| JP | 6-145785 | 5/1994 |
| JP | 10-30190 | 2/1998 |
| JP | 10-311381 | 11/1998 |

OTHER PUBLICATIONS

Edited by Metal Surface Finishing Society of Japan, "Metal Surface Finishing Society of Japan Handbook"; $2^{nd}$ edition; The Nikkan Kogyo Shinbun, Ltd. (Business and Technology Joural); Dec. 25, 1977; p. 521./Cited in the International Search Report.

International Search Report (2 pages), International Application No. PCT/JP02/11419, Feb. 2003.

*Primary Examiner*—Robert R. Koehler
(74) *Attorney, Agent, or Firm*—Armstrong, Kratz, Quintos, Hanson & Brooks, LLP

(57) ABSTRACT

A chain including chain pins 15, which connect an inner link plate and an outer link plate, are made of carburized or refined steel, and have the entire surface on which a large number of dimples 17 are provided which are formed through a primary shot peening performed at an arc height value of 0.35 to 0.8 mmA. Furthermore, dimples 21 with a size smaller than that of the dimples 17 are formed by applying a secondary shot peening performed at an arc height value smaller than that of a primary shot peening to the dimples 17 which have been subjected to the primary shot peening.

3 Claims, 7 Drawing Sheets

CHAIN

TECHNICAL FIELD

The present invention relates to chains such as a roller chain, a bushing chain, a leaf chain and a conveyer chain and, more particularly, to a chain pin which connects an inner link plate and an outer link plate.

BACKGROUND ART

Various types of chains including a roller chain generally employ steel for components such as inner link plates, outer link plates, and chain pins. With such steel chain, when components thereof reach durability limits due to repeated uses for an extended period of time, fatigue first occurs in the inner and outer link plates so that flexure deformation of the chain pin has a significant effect on fatigue fracture of the inner and outer plates.

FIG. 1 is a plan view of the main portion of a single-row roller chain for drive transmission. The roller chain includes a pair of parallel inner link plates 11, 11, a pair of parallel outer link plates 12, 12 which are disposed at a position outside of and displaced by one pitch from the inner link plates 11, 11, cylindrical bushings 13 which are disposed by fitting the ends thereof into the inner link plates 11, 11, cylindrical rollers 14 which are rotatably provided to the bushings 13 between the inner link plates 11, 11, and chain pins 15 which are inserted into the bushings 13 and disposed by fitting the ends thereof projecting from both ends of the bushings 13 into the outer link plates 12, 12.

FIG. 2 is a plan view of the main portion of the chain that shows conditions causing fatigue of the inner and outer link plates due to flexure deformation of the chain pins occurring in the single-row roller chain for drive transmission.

The roller chain undergoes a tensile loads in the directions of arrows a and b when being used. The tensile loads cause bending moments, shown in a stress distribution charts c and d, that are exerted to the chain pins 15 (hereinafter conveniently referred to as pin 15) so that the chain pins 15 warps in shapes illustrated by imaginary lines and the inner and outer link plates 11, 12 which are connected to the ends of the pins 15 deform in shapes indicated in imaginary lines. These result in breakdown of the inner and outer link plates 11, 12 due to accumulation of fatigue therein.

With such fatigue of the inner and outer link plates 11, 12, it has been known that if the pins 15 have a certain extent of residual compressive stress, the degree of flexure deformation of the pins 15 can be reduced so that the inner and outer link plates 11, 12 are able to withstand higher fatigue fracture limits. Therefore, standardized chains of ISO, JIS, ANSI, BS, and DIN use carburized pins which are made of carburized steel to have higher fatigue strength due to residual compressive stress. Thermal refined pins made of refined steel, i.e., medium carbon steel, are available as an alternative type of a chain pin (a chain pin is hereinafter conveniently referred to as carburized pin or refined pin as required). It has also been known that parts of the chain which have been heat-treated undergo surface treatment by shot peening.

However, the use of refined pins mentioned above is limited to a chain which is used a small number of repetitions at low speed and with a heavy load, since it has high creep rupture strength against impact loads, but low fatigue strength. Therefore, a trial is made to enhance the fatigue strength of the refined pin by changing the shape of the inner and outer link plates which are connected to each other by means of refined pins from a gourd shape having a narrow intermediate portion (Figure Eight Side Bar Style) into the shape of a cocoon having a wide waist (Wide Waist Figure Eight Side Bar Style) or an oval shape (Straight Side Bar Style). Steel balls with diameters slightly larger than those of the bushing holes of the heat-treated inner pin link plate and those of the pin holes of the heat-treated outer link plate are passed through the bushing holes and the pin holes, thereby giving residual compressive stress to the area around the holes of the inner and outer link plates so as to increase their fatigue strength. However, with a chain using the refined pins, not much satisfactory fatigue strength has been obtained as compared to a number of man-hours for production and the production costs.

On the other hand, the carburized pin with fatigue strength higher than the refined pin is suitable for the use as the chain which is operated repetitiously at high speeds, but has not so high enhancement of fatigue strength. Shot peening mentioned above serves as a soft shot for cleaning and finishing the surface of the parts through an approach such as removing the oxide coating film which are formed through heat treatment, and has not provided a maximum enhancement of fatigue strength. Thus, it is desirable that higher durability of the chain is achieved by enhancing residual compressive stress to increase the maximum allowable load.

The pins 15 of the roller chain shown in FIG. 1 is inserted into the bushings 13 which are installed between the inner link plates 11, 11. If the pin 15 and the bushing 13 are in a slide contact with each other for a long period of time, a clearance therebetween is widened due to sliding wear, thereby resulting in a stretched chain which is caused by accumulation of sliding wear between the chain pin and the bushing. Such stretch of the chain prevents smooth engagement of the chain with a sprocket, so that the stretch is believed to be limited to about 1.5 to 2.0%. Therefore, it is desired that a long life chain will be developed by making the stretch as short as possible.

The object of the present invention is to provide a chain having higher durability which is based on the enhancement in the maximum allowable load and reduction in friction resistance that are provided by enhancing residual compressive stress of the chain pin to reduce flexure deformation.

DISCLOSURE OF THE INVENTION

The chain according to the present invention comprises at least inner link plates, outer link plates, and chain pins which connect such link plates to each other. The chain pins, made of carburized steel or refined steel, are provided on the entire surface thereof with a large number of dimples formed by means of shot peening (hard shot peening) performed at an arc height value of 0.3 to 0.8 mmA.

Dimples with a size smaller than that of the dimples mentioned above are also formed on the surface of the chain pins which have undergone the hard shot peening (primary shot peening) by means of secondary shot peening performed at an arc height value smaller than that of the shot peening mentioned above. The use of steel balls deposited with iron-zinc alloy as a projecting medium for carrying out the secondary shot peening allows iron-zinc alloy coating film to be formed on the dimples with a size smaller than that of the dimples mentioned above.

The chain according to the present invention is provided with the increased residual compressive stress through primary shot peening that results in an enhancement in fatigue strength of the chain pins. Such pins are able to withstand a bending moment caused by tensile loads and enhance the fatigue fracture limit of the inner and outer link plates so that the maximum allowable load of the chain can be significantly increased. If the maximum allowable load may be comparable to that of the prior art, a one size smaller chain is acceptable, thereby achieving downsizing and weight saving.

In addition, the surface of the chain pins can be smoothened to as the highest degree as possible and can have a greater hardness by applying the secondary shot peening to the chain pins to downsize the dimple described above by forming an iron-zinc alloy coating film layer on the dimples which are formed by means of the secondary shot peening. This results in reduction in friction resistance that occurs between the chain pins and the bushings, and thereby improving in the durability of the chain.

BEST MODE FOR CARRYING OUT THE INVENTION

An embodiment according to the present invention will be described below with reference to FIGS. 3 to 11.

Figure 1:
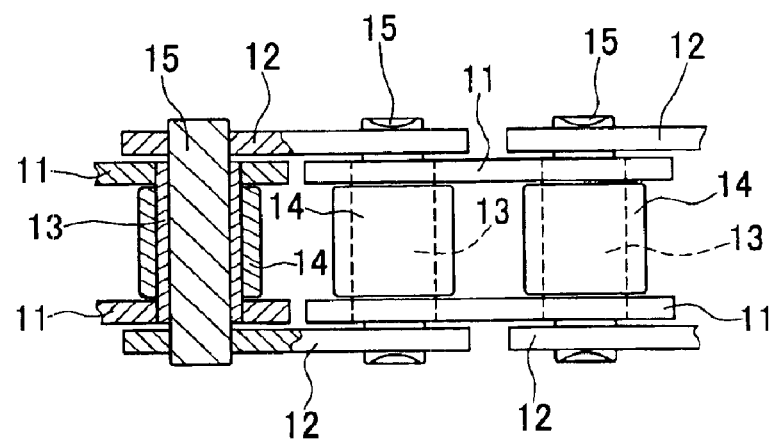
FIG. 1 is a sectional plan view of the main portion of a single-row roller chain for drive transmission.
Figure 2:
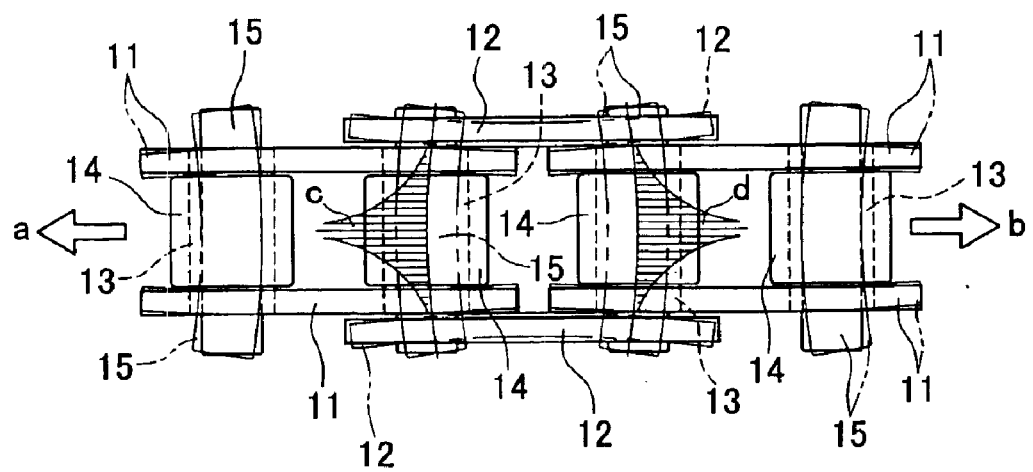
FIG. 2 is a plan view of the main portion of the chain showing conditions that cause fatigue of the inner and outer link plates due to flexure deformation of the chain pins that occurs in the roller chain shown in FIG. 1.
Figure 3:
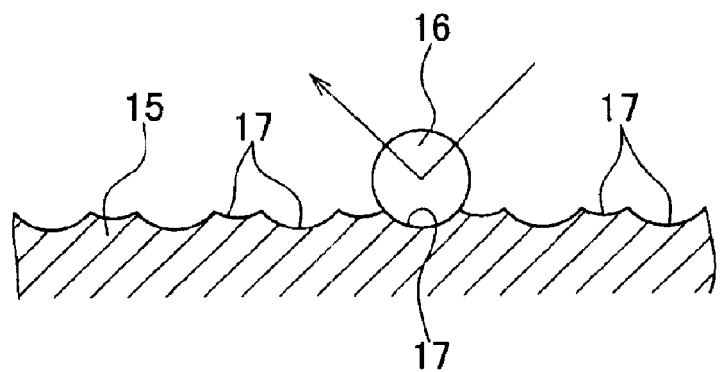
FIG. 3, which shows a first embodiment according to the present invention, is an enlarged sectional view of the main portion of the chain pin for explaining shot peening.

FIGS. 3 to 8 are drawings related to the first embodiment wherein the present invention is applied to the single-row roller chain for drive transmission shown in FIG. 1.

A chain pin 15, carburized steel or refined steel is used. The chain pin 15 undergoes heat treatment such as quenching, and tempering, and is subsequently subjected to hard shot peening. The hard shot peening is carried out by use of an impeller type shot peening machine (not shown) and a projection member (shot) 16 having hardness higher than that of the pin 15 (refer to FIG. 3). The hard shot peening places a plurality of heat-treated pins 15 in the shot peening machine and projects a large number of projection members 16 to the pins 15 by using a rotational centrifugal force of the impeller to form a large number of dimples 17 on the entire surface of the pin 15.

The dimples 17 are formed by projecting the projection member 16 with high hardness to carburized or refined steel pins 15 to depress and spread the surface layer of the pins 15 so that plastic deformation takes place beyond the yield point. The deformation is irreversible after the projection member 16 has bounced back, and therefore a large number of circular dents are left on the surface. Formation of a large number of the dimples 17 creates a significant magnitude of residual compressive stress under the surface of the pins 15 and the surface is simultaneously hardened to enhance the fatigue strength of the pins 15.

It is desirable that the projection member 16 has hardness higher than that of carburized and refined pins and is comprised of metallic balls such as steel or iron balls with a diameter of about 0.3 to 0.8 mm. The speed range from 40 to 120 m/sec is suitable for projection of the projection member 16.

Next, test example conducted by using a chain pin employed in a chain based on JIS-B-1801 No. 100 as a treated sample will be described referring to FIGS. 4 to 7.

In the test, impeller type was used as a shot peening machine and test piece A was used in measurement of the arc height value. Furthermore, carburized and refined pins with a diameter of 9.53 mm and a length of 39.2 mm were used as the pins 15, steel balls with a diameter of 0.6 mm were used as the projection member 16, and the projection member 16 was projected at a speed of 70 m/sec.

Figure 4:
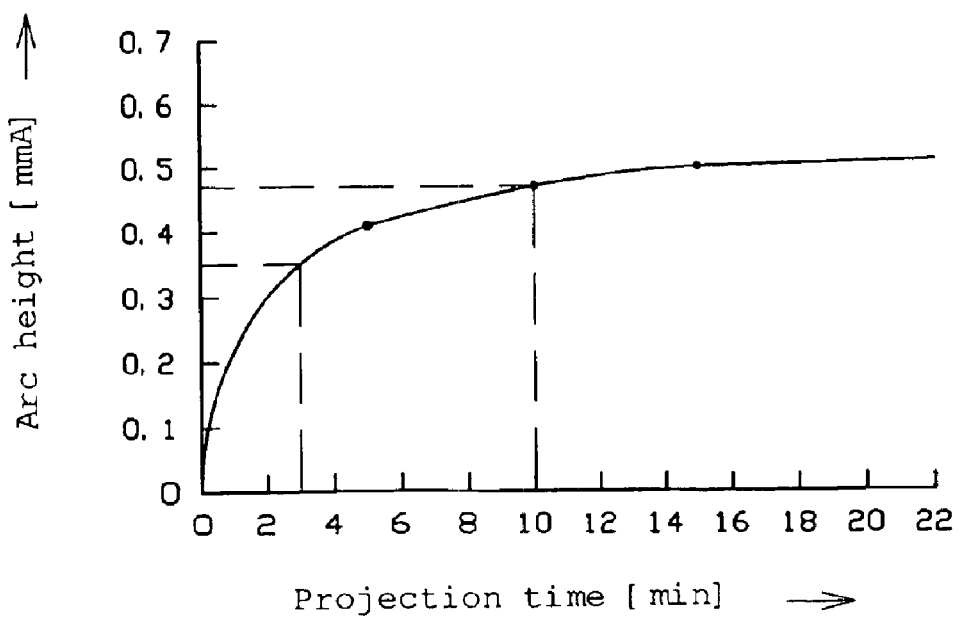
FIG. 4 is a diagram illustrating the relationship between arc height and projection time for the chain pin shown in the first embodiment.
Figure 5:
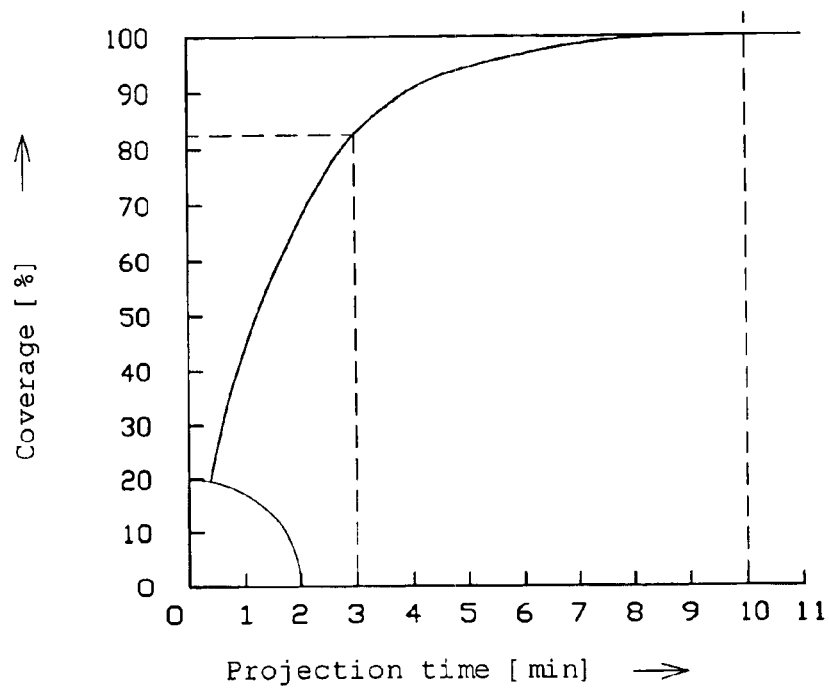
FIG. 5 is a diagram illustrating a relationship between coverage and projection time for the chain pin.

FIG. 5 indicates that a coverage that means a ratio of the surface area of the pins 15 to the number of the dimples increases with an increase in the time elapsed from the beginning of shot peening when hard shot peening (primary shot peening) is applied to the pins 15 under such conditions. The coverage reached 100% about 10 minutes after shot peening had been initiated so that the entire surface of the pin 15 was covered with a large number of dimples 17. FIG. 4 indicates arc height values which vary with an increase in the time elapsed after projection of the projection member has been initiated, and demonstrates that an arc height value of 0.475 mmA was obtained 10 minutes after initiation of projection with coverage 100%.

Figure 6:
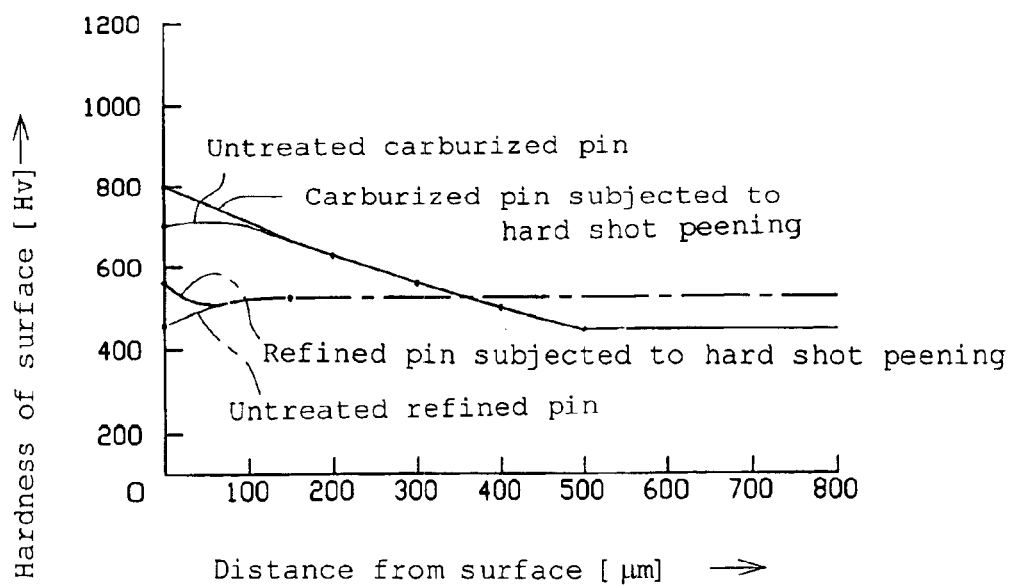
FIG. 6 is a diagram illustrating a relationship between hardness of the surface and the distance from the surface for the chain pin.

FIG. 6 indicates the hardness of the surface of the carburized and refined pins, and demonstrates that the carburized and refined pins which have been subjected to hard shot peening have been improved in hardness to a depth range of about 100 $\mu$m from the surface as compared with the carburized and refined pins which have been untreated.

Figure 7:
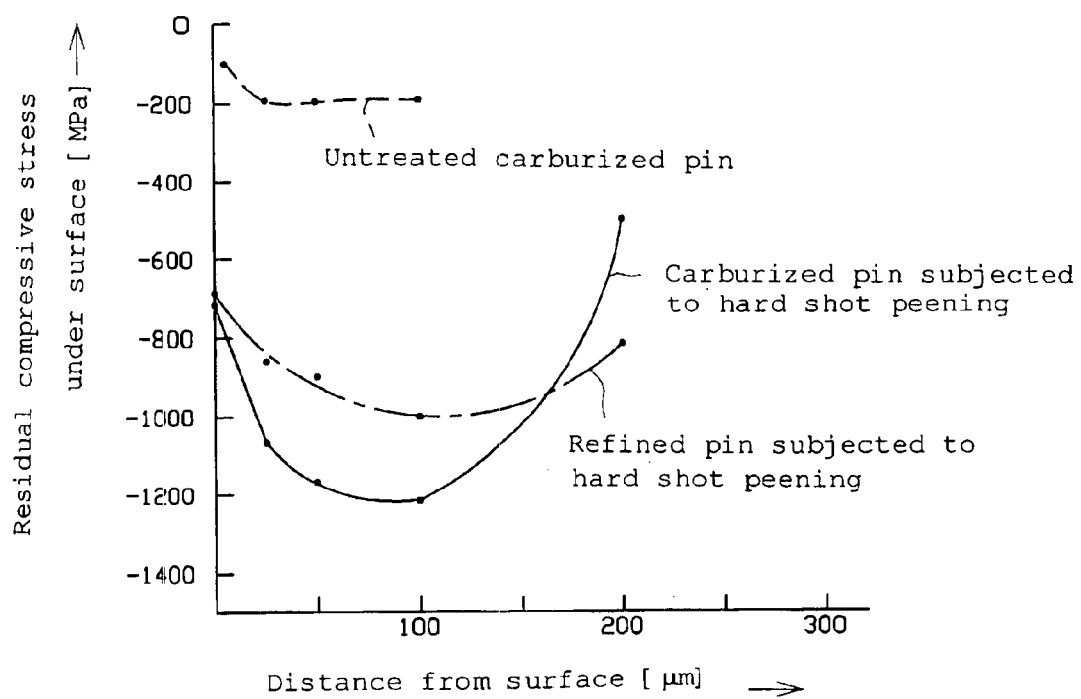
FIG. 7 is a diagram illustrating a relationship between residual compressive stress under the surface and the distance from the surface of chain pin.

FIG. 7 indicates a relationship between the residual compressive stress under the surface of the chain pin and a depth from the surface, and demonstrates that the carburized and refined pins which have been subjected to hard shot peening have been significantly improved in residual compressive stress in a depth range of about 200 $\mu$m from the surface as compared with the carburized pin which have been untreated. More specifically, the carburized and refined pins which have been subjected to hard shot peening achieve the 5 to 6 times improvement at maximum in residual compressive stress in a wide depth range of 200 $\mu$m from the surface as compared with the maximum residual compressive stress of −200 MPa that is obtained in a depth range of 100 $\mu$m from the surface by the carburized pin which have been untreated.

Figure 8:
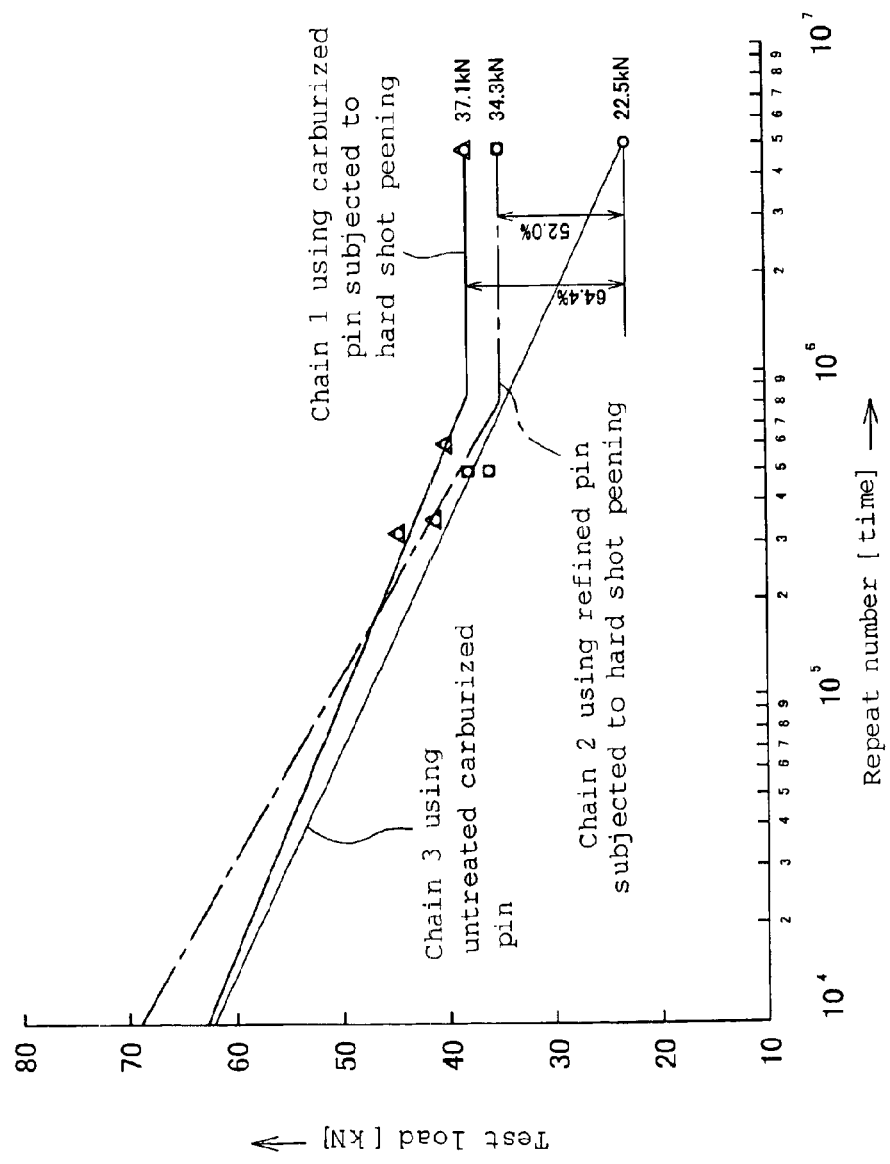
FIG. 8 is a diagram illustrating fatigue strength for the chain.

FIG. 8 indicates fatigue strength lines of chains based on JIS No. 100 which make comparison of a chain 1 using carburized pins subjected to hard shot peening described above, a chain 2 using refined pins subjected to the same hard shot peening, and a chain 3 using untreated carburized pins.

The fatigue strength lines demonstrate that the allowable load of the untreated chain 3 is gradually linearly reduced with an increase in the number of times that the chain 3 is used so that a fatigue limit is reduced to 22.5 kN (N means Newton) at that point of time when the chain 3 has been subjected to 5,000,000 durability tests based on JIS, whereas chains 1 and 2 using the carburized and refined pins respectively which are subjected to hard shot peening have achieved the maximum allowable load of 37.1 kN and 34.3 kN respectively after they have been subjected to 5,000,000 durability tests based on JIS.

More specifically, the chain 1 using carburized pins which have been subjected to hard shot peening achieved an improvement of 64.4% in the maximum allowable load as compared with the chain 3 using untreated pins. The chain 2 using refined pins which have been subjected to hard shot peening achieved an improvement of 52.0% in the maximum allowable load as compared with the chain 3 using untreated pins.

Thus, in this test example, the chain pins 15 have employed carburized and refined pins and been subjected to hard shot peening performed at an arc height value of 0.475 mmA to form a large number of dimples 17 on the surface of the pins 15 so that the residual compressive stress was increased under the surface of the pins 15, thereby achieving an improvement in fatigue strength of the chain pin 15.

Thus, when the chain pins 15 are used in the single-row roller chain for drive transmission, they successfully withstand bending moments due to tensile loads to enhance fatigue flexure limits of inner and outer link plates 11, 12 into which the chain pins 15 are fitted so that the maximum allowable loads of the roller chain are enhanced. An enhancement of 40% or more in the maximum allowable loads allows the chain to have strength comparable to that of a one-size larger chain and produces an improvement in durability of the chain of the same size. Alternatively, when the maximum allowable loads is allowed to be nearly equal to that as before, a one size smaller chain can be employed. This makes possible downsizing and weight saving.

Shot peening that is applied to the carburized and refined pins is preferably performed in the range of arc height values from 0.35 to 0.8 mmA. Arc height values of 0.8 mmA or more causes the impeller of the shot peening machine to rotate at a range of dangerous high speeds. Arc height values of 0.35 mmA or less allows a coverage to be reduced to about 80% (refer to FIGS. 4 and 5) so that the number of the dimples which are formed on the surface of the pin is significantly reduced and an improvement in residual compressive stress is not so much expected. Thus, both cases are not preferable.

For shot peening performed at an arc height value of 0.35 to 0.8 mmA, an impeller type of a peening machine is suitable. The projection member should be made of materials having hardness higher than that of the carburized and refined pin. The type, particle diameter, and projection speed of the projection member can be selected as appropriate.

Figure 9:
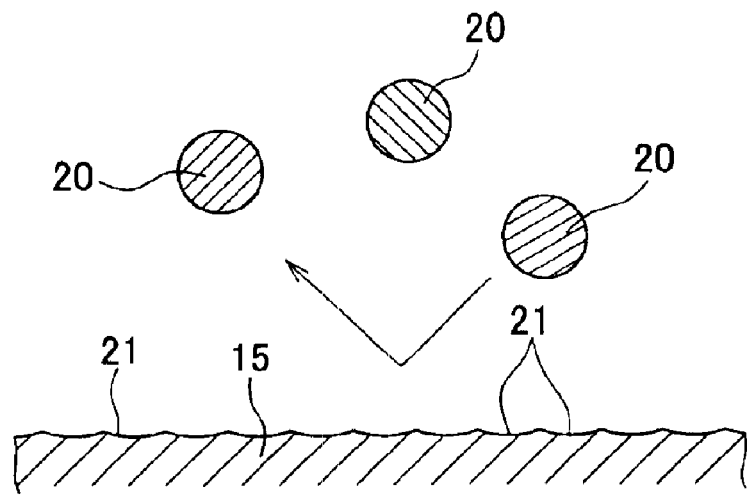
FIG. 9, which shows a second embodiment according to the present invention, is an enlarged sectional view of the main portion of the chain pin for explaining the secondary shot peening.

A second embodiment of the present invention will be described with reference to FIG. 9.

In the second embodiment, secondary shot peening is applied to chain pins 15 following hard shot peening (primary shot peening) shown in the first embodiment. In the secondary shot peening, a large number of projection members 20 are projected to the surface of pins 15 with a value smaller than an arc height values of 0.35 to 0.8 mmA used in the primary shot peening, thereby forming dimples 21 with a size smaller than dimples 17 formed in the primary shot peening. The secondary shot peening uses steel, iron, zinc, bead, or sand balls as the projection member.

As a result, the surface of pin 15 achieves a hardness higher than that achieved in the first embodiment and reduction in friction resistance between the bushing and the pin, thus resulting in an enhance in durability of the chain. In addition, the dimple 21 can serve as a reservoir for lubricating oil like the dimple 17 in the first embodiment to reduce friction resistance between the bushing and the pin for a long period, thus resulting in enhancement in durability of the chain.

Figure 10:
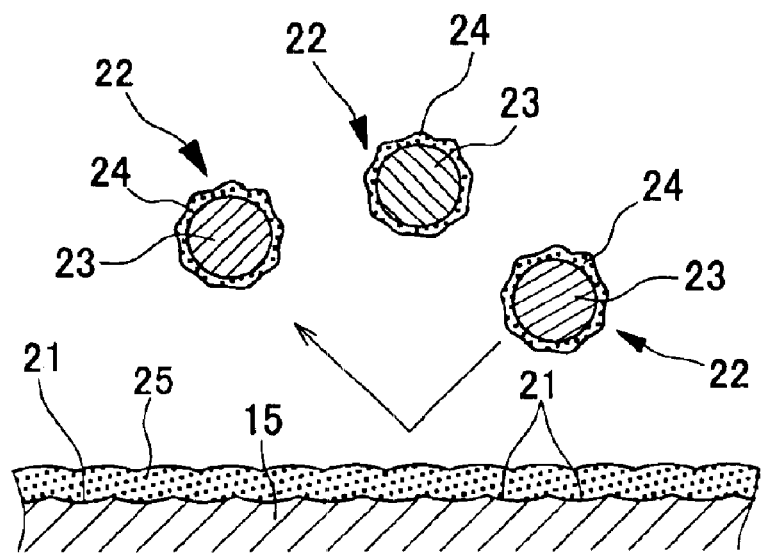
FIG. 10, which shows a third embodiment according to the present invention, is an enlarged sectional view of the main portion of the chain pin for explaining the secondary shot peening.
Figure 11:
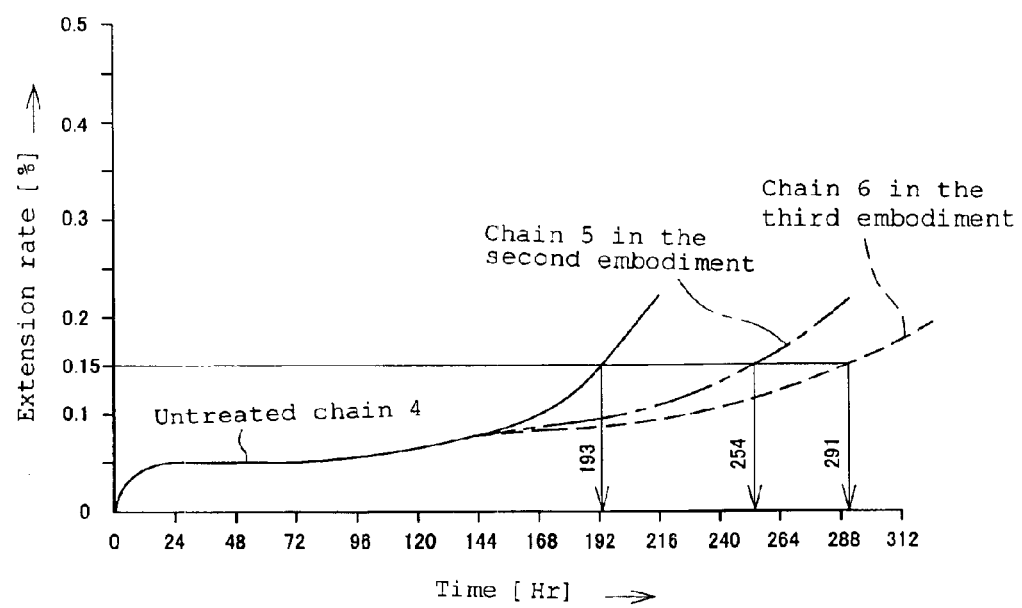
FIG. 11 is a diagram showing stretch rates of the chain using the pin in the second and third embodiments.

A third embodiment according to the present invention will be described with reference to FIG. 10. In this embodiment, like the second embodiment, the secondary shot peening is applied to the chain pins 15 following the primary shot peening.

A large number of steel balls 23, the surface of which is deposited with iron-zinc alloy 24, are used as the projection member 22 for the secondary shot peening in this embodiment and projected to the surface of the pins 15 at an arc height value smaller than 0.35 to 0.8 mmA for the primary shot peening, thereby transforming the dimple 17 which has been formed in the primary shot peening into a smaller-sized dimple 21. Iron-zinc alloy is simultaneously adhered from the surface of the projection member 22 onto the surface of the dimple 21 to form a coating film layer 25.

As a result, the surface of the pins 15 is rendered as smooth as possible by iron-zinc alloy coating film layer 25 and achieves an improvement in hardness, reduction in friction resistance between the bushing and the pin, and enhancement in durability. Further, the depressions on the surface of the coating film layer 25 are able to serve as a reservoir for lubricating oil so that friction resistance between the bushing and the pin is reduced for a long period and durability of the chain is further improved.

It is suitable that the secondary shot peening also uses an impeller type of the shot peening machine, and the diameter of the projection member and the projecting speed can be selected as appropriate.

What is claimed is:

1. A chain including at least chain pins which connect an inner link plate and an outer link plate, said chain pins comprising carburized steel or refined steel and having the entire surface on which a large number of dimples formed by means of shot peening performed at an arc height value of 0.35 to 0.8 mmA are provided.

2. The chain according to claim 1, wherein said dimples are transformed into smaller-sized dimples on the surface of said chain pins by means of the secondary shot peening performed at an arc height value smaller than that of said shot peening.

3. The chain according to claim 2, wherein an iron-zinc alloy film coating layer is formed on the surface of the dimples which have been formed by means of said secondary shot peening.

* * * * *